United States Patent [19]

Wuhrmann et al.

[11] Patent Number: 4,599,189

[45] Date of Patent: Jul. 8, 1986

[54] PARAFFIN-CONTAINING DEFOAMING COMPOSITIONS AND DETERGENT COMPOSITIONS CONTAINING SAME

[75] Inventors: Juan C. Wuhrmann; Karl D. Brands, both of Duesseldorf; Heinz Mueller, Wuppertal; Klaus Schumann, Erkrath; Theodor Altenschoepfer, Duesseldorf, all of Fed. Rep. of Germany

[73] Assignee: Henkel Kommanditgesellschaft auf Aktien, Duesseldorf, Fed. Rep. of Germany

[21] Appl. No.: 682,390

[22] Filed: Dec. 17, 1984

[30] Foreign Application Priority Data

Jan. 2, 1984 [DE] Fed. Rep. of Germany ........ 3400003

[51] Int. Cl.[4] .................. B01D 19/04; C09K 3/00; C11D 7/16; C11D 7/26
[52] U.S. Cl. .............................. 252/174.15; 252/99; 252/140; 252/174.25; 252/321; 252/358; 252/DIG. 10
[58] Field of Search ............. 252/321, 358, 174.15, 252/DIG. 10

[56] References Cited

U.S. PATENT DOCUMENTS

| | | | |
|---|---|---|---|
| 3,344,075 | 9/1967 | Scott | 252/321 X |
| 3,705,860 | 12/1972 | Duvall | 252/321 X |
| 4,192,761 | 3/1980 | Peltre et al. | 252/358 X |
| 4,265,779 | 5/1981 | Gandolfo et al. | 252/321 X |
| 4,339,342 | 7/1982 | Hempel et al. | 252/174.25 |
| 4,421,666 | 12/1983 | Hempel et al. | 252/321 X |
| 4,465,613 | 8/1984 | Carter | 252/321 X |

FOREIGN PATENT DOCUMENTS

| | | |
|---|---|---|
| 0008829 | 3/1980 | European Pat. Off. |
| 2112767 | 7/1983 | United Kingdom |

*Primary Examiner*—Richard D. Lovering
*Attorney, Agent, or Firm*—Ernest G. Szoke; Henry E. Millson, Jr.

[57] ABSTRACT

Defoaming agents for substantially surfactant-free detergents consisting of from about 0.05 to 25 parts by weight of pyrogenic, hydrophobized silica and from about 1 to 30 parts by weight of either a paraffin wax or mixture of paraffin waxes, both of which are solid at room temperature, i.e., the wax or mixture of waxes has a solidification point ranging from about 35° to 120° C. The defoaming agents may be liquid dispersions of the silica and paraffin wax in about 70 to 96 parts by weight of either branched primary alcohols ($C_{18}$–$C_{30}$), preferably Guerbet alcohols, or mineral oils. The defoaming agents may also be solid compositions, wherein the paraffin wax and silica are deposited on solid carriers.

25 Claims, No Drawings

PARAFFIN-CONTAINING DEFOAMING COMPOSITIONS AND DETERGENT COMPOSITIONS CONTAINING SAME

BACKGROUND OF THE INVENTION

1. Field of the Invention

This invention relates to a composition of matter comprising a physical mixture of pyrogenic, hydrophobized silica and paraffin waxes. The invention also relates to the use of this physical mixture as a defoaming composition in dishwashing detergents and particularly in substantially surfactant-free, alkaline detergents used to machine wash objects having hard surfaces. The invention also relates to dishwashing detergents containing the physical mixture.

2. Description Of The Relevant Art

It is known to use commercially available, substantially surfactant-free, alkaline detergents to wash objects having hard surfaces, such as crockery, glasses and cutlery in standard commercially available dishwashing machines. It is also known to use such detergents to wash eggs from egg-laying batteries in the appropriate machines before mechanical hatching. It is also known to use such alkaline detergents for the removal of food and other dirt remains from the washing machines.

However, detergency is impaired by the formation of foam in the washing machines. The reasons for foam formation include:

- the presence of foam-intensive food remains on crockery (for example egg, milk powder);
- a fall in temperature below the minimum operating temperatures which subsequently gives rise to foaming in heavy-duty machines because of entrained rinse-aid surfactants;
- unintentional emptying of the cleaning tank of heavy-duty washing machines accompanied by air being taken in by the recirculation pumps, which occurs, for example, when the machines are incorrectly loaded with articles having large surface areas, such as trays or the like, or when tank pipes are blocked by the remains of feathers, etc.; and
- faults in the design of the washing machine, such as poor zone separation in multiple-tank installations or inadequate liquor level.

Accordingly, foaming in domestic or industrial washing machines gives rise to a reduction in detergency because the spraying pressure falls drastically, the water no longer reaches the articles to be washed, and the mechanics of the wash liquor lose significance as a detergent factor. As a result of inadequate detergency, the dry shine effect in the case of crockery, for example, may not be achieved and, in unfavorable cases, damage can be caused both to the articles being washed and to the washing machine.

Although solutions to the problem of foaming in washing machines have been available for some time, they have never been totally satisfactory. For example, silicone-containing emulsions are separately added to the washing tanks of heavy-duty washing machines. Although these silicone-containing emulsions bring about the immediate collapse of any foam present, they have to be kept available separately in addition to the detergent and the rinse aid and thus may be forgotten by the user.

In addition, when silicone-containing defoaming agents are used, either as a separate product or incorporated in the detergent or, as is generally the case, in the rinse aid, the articles being washed are always in danger of becoming "siliconized." This adversely affects the wettability of the surfaces of the articles and can give rise to problems both in domestic and in commercial kitchens. For example, in the case of new-laid eggs, "siliconizing" can result in blocking of the fine shell pores, so that the contents of the eggs fail to receive oxygen and die, producing a reduction in the hatching rate.

Even the use of highly propoxylated, foam-suppressing surfactants, such as the adduct of polyglycerine and 22 moles of propylene oxide, which adduct has a molecular weight of around 2,000, is not a practicable solution to the problem. These surfactants tend to interact with ingredients of the detergents, particularly with caustic alkalis and chlorine donors, to discolor the products. At the same time, the defoaming effect of the additives diminishes.

In view of these circumstances, defoaming agents for dishwashing detergents have to satisfy the following requirements:

High specific activity, so that the amount of the defoaming agent in the detergent as a whole may be minimized;

Chemical compatibility with other ingredients, particularly with caustic alkalis, alkalis, such as metasilicates, and chlorine carriers;

No adverse effect upon shelf life;

Ecological and toxicological acceptability;

Good biodegradability; and

An insignificant silicone content to avoid "siliconizing" the articles being washed.

DESCRIPTION OF THE INVENTION

It has been found that the use of a physical mixture of effective amounts of pyrogenic, hydrophobized silica and paraffin waxes as defoaming compositions in dishwashing detergents and particularly in substantially surfactant-free, alkaline detergents for the machine washing of objects having hard surfaces can satisfy the above-mentioned requirements.

Dishwashing detergents are well-known and are readily available commercially. In particular, substantially surfactant free alkaline detergents are well-known and are readily available commercially. In addition to suppressing foam when used with such detergents, the paraffin-wax-containing liquid defoaming compositions of the present invention can also have a dust-binding and anti-caking effect on the detergents, thus making the detergents easier to handle.

Accordingly, the compositions used in accordance with the invention comprise (1) at least one paraffin wax, preferably a mixture, which is solid at room temperature, i.e., having a solidification point of from about 35° to 120° C., and (2) a pyrogenic, hydrophobized silica.

The paraffin wax or mixture of paraffin waxes and the pyrogenic, hydrophobized silica may either be physically dispersed in a liquid carrier or mixed with a powder-form carrier. The defoaming agents which are produced in solid form by mixing with carriers may be mixed with the detergent ingredients in any known manner.

The liquid defoaming compositions in accordance with the invention may also be sprayed in any known manner onto the actual powder-form or granulated detergent constituents, in which case these constituents themselves act as carriers. In addition, the defoaming composition of the present invention may be incorporated during the granulation of all or some of the ingredients of the detergents.

To produce the liquid defoaming compositions, the paraffin wax and pyrogenic, hydrophobized silica are dispersed in about 60 to 99 parts by weight, preferably 70 to 96 parts by weight, more preferably 88 to 95 parts by weight, of a carrier liquid. The carrier liquid is preferably a liquid, branched-chain primary alcohol, more specifically, a Guerbet alcohol, or a mineral oil or mixtures thereof.

The amount of hydrophobized, pyrogenic silica dispersed in the carrier liquid is between about 0.05 and 25 parts by weight, preferably between 0.5 and 10 parts by weight, more preferably between 0.6 and 1.5 parts by weight. The amount of the paraffin wax or mixture of paraffin waxes is between about 1 and 30 parts by weight, preferably between 3 and 25 parts by weight, more preferably between 4.4 and 10.6 parts by weight. In other words, in a physical mixture of the pyrogenic, hydrophobized silica and the paraffin wax or mixture of paraffin waxes, the ratio of the wax or mixture of waxes to the silica ranges from about 0.04:1 to 600:1, preferably from 0.3:1 to 500:1.

The defoaming compositions used in accordance with the invention may also consist of the paraffin wax or mixture of paraffin waxes, which are solid at room temperature, and the pyrogenic, hydrophobized silica in combination with a powder-form water-soluble carrier. The respective proportions of the defoaming constituents and the solid carrier, which are combined by physical mixing, are the same as those described above for the liquid defoaming composition of the present invention.

The powder-form water-soluble carrier should be compatible with the aqueous system to be defoamed. One of ordinary skill in the art can readily select such a carrier without undue experimentation.

Particularly suitable carriers include the alkali salts of polymeric phosphates, borates, carbonates, silicates, sulfates or mixtures thereof. Calcined sodium triphosphate is preferably used. If a phosphate-free carrier is required, calcined or hydrated sodium sulfate is preferred.

Pyrogenic, hydrophobized silicas are well-known in the art and are readily available commercially. The specific surface area of pyrogenic, hydrophobized silicas is between about 100 and 300 $m^2/g$ and the average primary particle size is between about 5 m$\mu$ and 50 m$\mu$. Hydrophobizing is accomplished, for example, by treatment with alkyl chlorosilane as described in U.S. Pat. No. 3,388,073, which is specifically incorporated in its entirety by reference herein.

Solid paraffin waxes are used either alone or in combination in the defoaming compositions of the present invention. Suitable waxes and mixtures of waxes have a solidification point of from about 35° to 120° C.

The compounds known collectively as "paraffin waxes" are natural vegetable or animal waxes which may be isolated from fossil materials, such as lignite, peat and, in particular, petroleum. Paraffin waxes also include synthetic waxes obtainable, for example, by the Fischer-Tropsch process, by the polymerization of ethylene or by the thermal degradation of high molecular weight polyethylene. Suitable solid paraffin waxes and mixtures thereof are readily available commercially.

Chemically, paraffin waxes consist of long-chain hydrocarbons. The paraffins may be linear paraffins, isoparaffins or cyclic paraffins having side chains but no other functional groups.

Paraffin waxes are generally complex without a clear melting point. Accordingly, they are characterized by their solidification point (S.P.). The solidification point is the temperature range in which the wax changes from the liquid to the solid state by slow cooling.

Suitable waxes for use in accordance with the invention should have a solidification point in the range of from about 35° to 120° C. This criterion coupled with their ready commercial availability makes natural and synthetic paraffin waxes and mixtures thereof particularly suitable.

It is preferred to use paraffin wax mixtures of:
(a) from about 20 to 60% by weight of microcrystalline paraffin wax having a solidification point of from about 60° to 95° C.,
(b) from about 15 to 60% by weight of hard paraffin having a solidification point of from about 40° to 60° C., and
(c) from about 1 to 50% by weight of soft paraffin having a solidification point of from about 32° to 42° C.

Component (a) may consist of any of the known microcrystalline paraffin waxes which have a solidification point in the range of from about 60° to 95° C., preferably in the range of from 62° C. to 90° C. Microcrystalline waxes such as these are, for example, a constituent of montan waxes and high-melting petroleum fractions (ceresin) and are distinguished by containing branched and cyclic paraffins. The proportion of component (a) in the paraffin wax mixture preferably amounts to between 30 and 55% by weight and, more preferably, to between 40 and 50% by weight.

Component (b) may consist of standard paraffin hydrocarbons, generally known as hard paraffin, which, unlike the microcrystalline waxes in component (a), show more or less pronounced crystallization behavior. The solidification point of these hydrocarbons is in the range of from about 40° C. to 60° C., preferably in the range from 42° C. to 56° C. The proportion of component (b) in the paraffin wax mixture is from about 15 to 60% by weight, preferably from 20 to 50% by weight, more preferably, from 25 to 45% by weight.

The total quantity of components (a) and (b) in mixtures of paraffin waxes which do not contain any other foam-inhibiting components should amount to at least 50% by weight, preferably 65 to 85% by weight.

Component (c) is present in the paraffin wax mixtures in a proportion of from about 1 to 50% by weight, preferably from 5 to 25% by weight. Component (c) consists essentially of soft paraffin having a solidification point in the range of from about 32° C. to 42° C., preferably 35° C. to 40° C. Paraffin fractions such as these are commercially available, for example, as Vaseline ® petroleum jelly.

The organic liquid used for dispersing the defoaming compositions according to the invention is preferably a branched-chain, primary $C_{18}$–$C_{30}$-alcohol, more particularly a Guerbet alcohol. Guerbet alcohols are single-branch, isoalcohols obtained by the Guerbet reaction from fatty alcohols. They correspond to the following general formula:

$$R-CH_2-CH_2-\underset{R'}{CH}-CH_2-OH$$

in which R and R' may be the same or different and represent alkyl radicals containing from 4 to 16 carbon atoms. Guerbet alcohols containing a total of 18 to 30 carbon atoms are particularly preferred for the compositions according to the invention. The Guerbet alcohols may be used as single compounds or mixtures. Alcohols which are liquid at room temperature are preferred.

Other branched-chain primary alcohols, such as products of corresponding chain length obtainable by oxosynthesis, may also be used. High defoaming activity and simple, inexpensive availability of raw materials are optimal criteria in selecting the Guerbet alcohols.

Aliphatic hydrocarbons, particularly mineral oils, which are liquid at room temperature may also be present in the formulations. Mineral oil is the generic term for liquid distillation products consisting essentially of mixtures of saturated hydrocarbons which are obtained from mineral raw materials (petroleum, peat, etc.). By contrast, in living organisms, the oils consist of mixed glycerin esters of fatty acids. These oils of vegetable origin may also be used.

The following examples are given for the purpose of illustration only and are in no way limitative of the present invention.

EXAMPLES

The order in which the constituents are mixed is not crucial. However, it is advisable to introduce the carrier liquid first, then the molten paraffin waxes and, immediately afterwards, the hydrophobized, pyrogenic silica. Although the components may be stirred into the mixture at any speed, it is preferred to use a blade stirrer operating at normal speeds.

Liquid defoaming compositions according to the invention were obtained by homogenizing the individual ingredients with a blade stirrer in the carrier liquids indicated. To ensure thorough mixing of the paraffin waxes, which are solid at room temperature, with the mineral oil component, homogenization had to be carried out at temperatures above the melting point of the wax or wax mixture used.

To prepare the solid defoaming compositions, calcined sodium triphosphate having an apparent density of from 0.4 to 0.5 kg/l (Thermophos L ® product of Hoechst AG) was introduced and heated to 50°–90° C. in a 0.75 liter capacity laboratory kneader equipped with a heatable working vessel (Manufacturers: Janke & Kunkel, Staufen/Breisgau, Federal Republic of Germany). The mixture of the hydrophobized silica and the paraffin or paraffin mixture liquefied by heating to 90° C., was then added in the quantity indicated. The mixture was then cooled to room temperature with continued stirring.

The following compositions (A) through (E) were prepared using the components as indicated:

| | |
|---|---|
| (A) Liquid | 95.0 parts by weight of mineral oil boiling above 280° C. (Ellmo SO 40 ® product of Shell Oil Corp. |
| | 4.4 parts by weight of paraffin wax solidifying at 42 to 44° C. |
| | 0.6 part by weight of hydrophobized silica (Sipernat D 10 ® product of Degussa) |
| (B) Liquid | 95.0 parts by weight of 2-n-octyldecanol, |
| | 0.5 part by weight of Vaseline ® petroleum jelly, |
| | 1.7 parts by weight of paraffin wax solidifying at 42 to 44° C. |
| | 2.2 parts by weight of microcrystalline wax solidifying at 85 to 86° C. (Witcodur 272 ® product of Witco), |
| | 0.6 part by weight of hydrophobized silica (Sipernat D 10 ® product of Degussa), |
| (C) Solid | 88.0 parts by weight of Thermophos L ® product of Hoechst AG, |
| | 10.6 parts by weight of paraffin wax solidifying at 42 to 44° C. |
| | 1.4 parts by weight of hydrophobized silica (Sipernat D 10 ® product of Degussa), |
| (D) Solid | 88.0 parts by weight of Thermophos L ® product of Hoechst AG, |
| | 1.2 parts by weight of Vaseline ® petroleum jelly, |
| | 4.1 parts by weight of paraffin wax solidifying at 42 to 44° C. |
| | 5.3 parts by weight of microcrystalline wax solidifying at 85 to 86° C. |
| | 1.4 parts by weight of hydrophobized silica (Sipernat D 10 ® product of Degussa), |
| (E) Solid | 88.0 parts by weight of Thermophos L ® product of Hoechst AG, |
| | 7.9 parts by weight of paraffin wax solidifying at 42 to 44° C. |
| | 2.6 parts by weight of microcrystalline wax solidifying at 85 to 86° C. |
| | 1.5 parts by weight of hydrophobized silica (Sipernat D 10 ® product of Degussa). |

The defoaming compositions were added to the detergents, irrespective of their formulation, in quantities of from 0.05 to 5% by weight, preferably from 0.5 to 2.5% by weight, based on the weight of the detergent.

The effectiveness of the defoaming compositions was tested by two different methods:

I. INTENSIVE FOAMER

The foam-suppressing effect of products A to E was tested by the method described in the Article entitled "Die Ernahrungsindustrie" in Fette, Seifen, Anstrichmittel 66 (1964) pages 528 to 530.

In this test, 34 liters (1) were pump-recirculated at a rate of 160 to 180 l/minute and at a temperature of 65° C. 76 g of whole egg and 38 g of detergent with/without defoaming compositions were then added together with 100 ml of cold water (approximately 15° C.) and heated during circulation to 65° C. After that temperature had been reached (i.e., after about 25 minutes), the height of the remaining foam was read from a scale after the machine had been switched off. The height of the foam (blank value), 76 g of whole egg with 38 g of non-defoamed detergent, amounted to 240 mm.

The detergent used consisted of:
- 37 parts by weight of pentasodium triphosphate;
- 44 parts by weight of sodium metasilicate, anhydrous;
- 1.5 parts by weight of sodium dichloroisocyanurate, anhydrous,
- 8 parts by weight of sodium carbonate, anhydrous; and the balance water.

II. DOMESTIC DISHWASHING MACHINE 38 g of whole egg and 38 g of detergent with/without defoaming composition were introduced into a Miele G 503 S domestic dishwashing machine at the beginning of the wash cycle (normal 65° C. program). The pump pressure in the recirculation system of the machine was recorded by a printer. The pump pressure increased with increasing foam volume while the blank value curve showed a steady trend.

BLANK VALUE (a) 38 g of detergent (for formulation, see under I);
(b) 38 g of whole egg/38 g of detergent.

APPLICATION EXAMPLES

1. A detergent consisting of:
   35 parts by weight of pentasodium triphosphate, anhydrous;
   46 parts by weight of sodium metasilicate, anhydrous;
   1 part by weight of trichloroisocyanuric acid;
   10 parts by weight of sodium carbonate, anhydrous; and the balance water was sprayed with 1.0 part by weight of the liquid defoaming composition A in a 5 kg Lodige mixer. The defoaming effect was tested by method II, described above, using a Miele G 503 S domestic dishwashing machine.

The print-out showed that the brief foaming of the wash liquor at relatively low temperature was suppressed by the defoaming composition and the full pump pressure remained substantially intact in the recirculation system virtually over the entire duration of the washing cycle.

2. A detergent consisting of:
   37 parts by weight of pentasodium triphosphate, anhydrous;
   46 parts by weight of sodium pentasilicate, anhydrous;
   1 part by weight of trichloroisocyanuric acid;
   10 parts by weight of sodium carbonate, anhydrous; and the balance water was sprayed with 1.0 and 1.5 parts by weight of defoaming composition B (at the expense of the water content) in a 5 kg Lodige mixer. The defoaming effect was tested by the method II, described above, using a Miele G 503 S domestic dishwashing machine. The print-out showed an increase in pressure to the foamless state only 30 seconds after the addition of 1.0 part by weight of the defoaming composition. The addition of 1.5 parts by weight of the defoaming composition totally inhibited foam formation from the outset.

3. A detergent consisting of:
   37 parts by weight of pentasodium triphosphate, anhydrous;
   44 parts by weight of sodium metasilicate, anhydrous;
   1.5 parts by weight of Na-dichloroisocyanurate, anhydrous;
   8 parts by weight of sodium carbonate, anhydrous;
   1 part by weight of defoaming composition B; and the balance water was tested by the method I, described above, in an intensive foamer.

| Time (sec.) | Foam height mm | |
|---|---|---|
| | Blank value (without defoamer) | Product 3 |
| 0 | 240 | 20 |
| 30 | 230 | 20 |
| 60 | 230 | 25 |
| 90 | 230 | 30 |
| 120 | 230 | 25 |
| 300 | 230 | 30 |
| 1200 | 230 | 40 |

Despite the high whole egg content of the wash liquor, the foam-inhibiting effect of defoaming composition B was clearly apparent from the beginning of the test.

4. A detergent consisting of:
   45 parts by weight of pentasodium triphosphate, anhydrous;
   15 parts by weight of sodium metasilicate, anhydrous;
   20 parts by weight of caustic soda (NaOH).
   17 parts by weight of sodium carbonate, anhydrous;
   2 parts by weight of trichloroisocyanuric acid; and
   1 part by weight of defoaming composition B;

was tested by the method I, described above, using an intensive foamer.

| Time (sec.) | Foam height mm | |
|---|---|---|
| | Blank value (without defoamer) | Product 4 |
| 0 | 230 | 40 |
| 30 | 230 | 45 |
| 60 | 230 | 40 |
| 90 | 230 | 50 |
| 120 | 230 | 40 |
| 300 | 230 | 40 |
| 1200 | 230 | 50 |

In this case, too, significant foam inhibition was observed from the outset.

5. A detergent consisting of:
   37 parts by weight of pentasodium triphosphate, anhydrous;
   48 parts by weight of sodium metasilicate, anhydrous;
   1 part by weight of Na-dichloroisocyanurate, anhydrous;
   5 parts by weight of sodium carbonate, anhydrous; and the balance water was mixed with 1.0 part by weight of defoaming composition C and the resulting mixture was tested by the method II, described above, in a Miele G 503 S domestic dishwashing machine. In this case, too, the pressure corresponding to foamless operation remained intact throughout the entire duration of the program.

6. A detergent consisting of:
   37 parts by weight of pentasodium triphosphate, anhydrous;
   44 parts by weight of sodium metasilicate, anhydrous;
   1.5 parts by weight of Na-dichloroisocyanurate, anhydrous;
   8 parts by weight of sodium carbonate, anhydrous; and the balance water was mixed with 0.3 and 1 part by weight of defoaming composition D and tested by the method I, described above, in an intensive foamer.

| Time (sec.) | Foam height mm | | |
|---|---|---|---|
| | Blank value (without defoamer) | Product 6 | |
| | | 0.3 | 1.0 parts by weight |
| 0 | 240 | 190 | 10 |
| 30 | 230 | 190 | 10 |
| 60 | 230 | 180 | 10 |
| 90 | 240 | 160 | 15 |
| 120 | 240 | 140 | 20 |
| 300 | 240 | 110 | 10 |
| 1200 | 240 | 80 | 10 |

The addition of only 0.3 part by weight of the defoaming composition was sufficient to produce a reduction in foaming. The addition of 1.0 part by weight of the defoaming composition almost completely inhibited foaming, even from the very begininning.

7. A detergent consisting of:
22 parts by weight of pentasodium triphosphate, anhydrous;
10 parts by weight of sodium aluminium silicate (zeolite A);
46 parts by weight of sodium metasilicate, anhydrous;
2 parts by weight of trichloroisocyanuric acid;
12 parts by weight of sodium carbonate, anhydrous; and the balance water mixed with 0.5 part by weight of defoaming composition E and the resulting mixture was tested by the method I, described above, in an intensive foamer. No foaming was observed.

| Time (sec.) | Foam height mm | |
| --- | --- | --- |
| | Blank value (without defoamer) | Product 7 0.5 part by weight |
| 0 | 240 | 20 |
| 30 | 240 | 20 |
| 90 | 240 | 20 |
| 120 | 240 | 20 |
| 300 | 240 | 20 |
| 1200 | 240 | 20 |

In addition to the absence of foam, the effect of the liquid and solid defoaming compositions A to E, as described in Examples 1 to 7, was also reflected in a favorable shelf life. After storage for 6 months at 30° C./70% relative air humidity, all the products were still free-flowing, and the loss of active chlorine, at 20 to 30%, was quite normal.

The detergent compositions in the preceding Examples are surfactant-free. However, small quantities of up to about 2% by weight, preferably of up to about 1.5% by weight, of alkali-stable and active-chlorine-stable nonionic surfactants may also be present. If such small amounts of nonionic surfactants are present, the compositions in accordance with the present invention may nonetheless be considered "substantially surfactant-free."

What is claimed is:

1. A composition of matter consisting essentially of a physical mixture of (1) pyrogenic, hydrophobized silica; and (2) a mixture of paraffin waxes containing
   (a) from about 20 to about 60% by weight of microcrystalline paraffin wax having a solidification point ranging from about 60° to about 95° C.,
   (b) from about 15 to about 60% by weight of hard paraffin having a solidification point ranging from about 40° to about 60° C., and
   (c) from about 1 to about 50% by weight of soft paraffin having a solidification point ranging from about 32° to about 42° C.,
   and wherein the ratio of said mixture of waxes to said silica ranges from about 0.04:1 to about 600:1.

2. The composition of claim 1, wherein component (2) (a) includes from about 30 to about 55% by weight of microcrystalline wax having a solidification point ranging from about 62° to about 90° C.

3. The composition of claim 2, wherein component (2) (a) includes from about 40 to about 55% by weight of said microcrystalline wax.

4. The composition of claim 1 wherein component (2) (b) includes from about 20 to about 50% by weight of a hard paraffin having a solidification point ranging from about 42° to about 52° C.

5. The composition of claim 4, wherein component (2) (b) includes from about 25 to about 45% by weight of said hard paraffin.

6. The composition of claim 1, wherein component (2) (c) includes from about 5 to about 25% by weight of soft paraffin having a solidification point ranging from about 35° to about 40° C.

7. The composition of claim 1, wherein component (2) (a) includes from about 30 to about 55% by weight of microcrystalline wax having a solidification point ranging from about 62° to about 90° C.; component (2) (b) includes from about 20° to about 50° by weight of a hard paraffin having a solidification point ranging from about 42° to about 52° C.; and component (2) (c) includes from about 5 to about 25% by weight of soft paraffin having a solidification point ranging from about 35° to about 40° C.

8. The composition of claim 7, wherein component (2) (a) includes from about 40 to about 55% by weight of said microcrystalline wax; and component (2) (b) includes from about 25 to about 45% by weight of said hard paraffin.

9. The composition of claim 1, wherein the ratio of said mixture of waxes to said silica ranges from about 0.3:1 to about 500:1.

10. A defoaming composition of matter consisting essentially of (A) from about 60 to about 99 parts by weight of a carrier, and (B) a physical mixture of (1) from about 0.05 to about 25 parts by weight of pyrogenic, hydrophobized silica, and (2) from about 3 to about 25 parts by weight of a mixture of waxes containing
    (a) from about 20 to about 60% by weight of microcrystalline paraffin wax having a solidification point ranging from about 60° to about 95° C.,
    (b) from about 15 to about 60% by weight of hard paraffin having a solidification point ranging from about 40° to about 60° C., and
    (c) from about 1 to about 50% by weight of soft paraffin having a solidification point ranging from about 32° to about 42° C.;
    and said silica and said mixture of waxes being present in an amount effective to reduce the foaming of a dishwashing detergent.

11. The defoaming composition of matter of claim 10, consisting essentially of from about 70 to about 96 parts by weight of said carrier; from about 0.5 to about 10 parts by weight of said silica; and from about 3 to about 25 parts by weight of said mixture of waxes.

12. The defoaming composition of matter of claim 11, consisting essentially of from about 88 to about 95 parts by weight of said carrier, from about 0.6 to about 1.5 parts by weight of said silica; and from about 4.4 to about 10.6 parts by weight of said mixture of waxes.

13. The defoaming composition of matter of claim 10, wherein said carrier is a liquid.

14. The defoaming composition of matter of claim 13, wherein said liquid carrier is selected from the group consisting of a branched-chain primary alcohol, a mineral oil and mixtures thereof.

15. The defoaming composition of matter of claim 14, wherein said liquid carrier is a branched-chain primary $C_{18}$–$C_{30}$ alcohol.

16. The defoaming composition of matter of claim 15, wherein said branched-chain primary $C_{18}$–$C_{30}$ alcohol is a Guerbet alcohol.

17. The defoaming composition of matter of claim 14, wherein said branched-chain primary alcohol has the formula

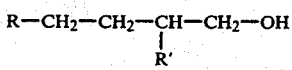

wherein R and R' may be the same or different and represent alkyl radicals containing from 4 to 16 carbon atoms.

18. The defoaming composition of matter of claim 10, wherein said carrier is a solid.

19. The defoaming composition of matter of claim 18, wherein said solid carrier is an alkali salt of polymeric phosphates, borates, carbonates, silicates, sulfates or mixtures thereof.

20. The defoaming composition of matter of claim 19, wherein said solid carrier is selected from the group consisting of calcined sodium triphosphate, calcined sodium sulfate and hydrated sodium sulfate.

21. The defoaming composition of matter of claim 10, wherein component (B) (2) (a) includes from about 30 to about 55% by weight of microcrystalline wax having a solidification point ranging from about 62° to about 90° C.; component (B) (2) (b) includes from about 20 to about 50% by weight of a hard paraffin having a solidification point ranging from about 42° to about 52° C.; and component (B) (2) (c) includes from about 5 to about 25% by weight of soft paraffin having a solidification point ranging from about 35° to about 40° C.

22. The defoaming composition of matter of claim 21, wherein component (B) (2) (a) includes from about 40 to about 55% by weight of said microcrystalline wax; and component (B) (2) (b) includes from about 25 to about 45% by weight of said hard paraffin.

23. A defoaming detergent comprising:
(I) a dishwashing detergent component; and
(II) from about 0.5 to about 5% by weight of the detergent component of a defoamer component consisting essentially of:
(A) from about 60 to about 99 parts by weight of a carrier, and
(B) a physical mixture of
(1) from about 0.05 to about 25 parts by weight of pyrogenic, hydrophobized silica, and
(2) from about 1 to about 30 parts by weight of a mixture of waxes containing
(a) from about 20 to about 60% by weight of microcrystalline paraffin wax having a solidification point ranging from about 60° to about 95° C.,
(b) from about 15 to about 60% by weight of hard paraffin having a solidification point ranging from about 40° to about 60° C., and
(c) from about 1 to about 50% by weight of soft paraffin having a solidification point ranging from about 32° to about 42° C.

24. The defoaming detergent of claim 23, wherein said defoamer component is present in an amount of from about 0.5 to about 2.5% by weight of the detergent component.

25. The defoaming detergent of claim 23, wherein said defoamer component is present in an amount of from about 0.3 to about 1.5% by weight of the detergent component.

* * * * *